US010999037B2

United States Patent
Liu et al.

(10) Patent No.: US 10,999,037 B2
(45) Date of Patent: May 4, 2021

(54) METHOD AND DEVICE FOR TRANSMITTING DOWNLINK CONTROL INFORMATION

(71) Applicant: Telefonaktiebolaget LM Ericsson (publ), Stockholm (SE)

(72) Inventors: Jinhua Liu, Beijing (CN); Gen Li, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/315,838

(22) PCT Filed: Jul. 26, 2018

(86) PCT No.: PCT/CN2018/097197
§ 371 (c)(1),
(2) Date: Jan. 7, 2019

(87) PCT Pub. No.: WO2019/029374
PCT Pub. Date: Feb. 14, 2019

(65) Prior Publication Data
US 2020/0084002 A1    Mar. 12, 2020

(30) Foreign Application Priority Data

Aug. 9, 2017   (WO) ................ PCT/CN2017/096561

(51) Int. Cl.
*H04L 5/00*       (2006.01)
*H04W 72/04*    (2009.01)

(52) U.S. Cl.
CPC .......... *H04L 5/0053* (2013.01); *H04L 5/0007* (2013.01); *H04L 5/0048* (2013.01);
(Continued)

(58) Field of Classification Search
CPC . H04L 5/0053; H04L 5/0094; H04W 72/0446
See application file for complete search history.

(56) References Cited

U.S. PATENT DOCUMENTS

2017/0201968 A1* 7/2017 Nam ................... H04W 72/042
2017/0273079 A1* 9/2017 Park ..................... H04L 5/0094
(Continued)

FOREIGN PATENT DOCUMENTS

| CN | 105246164 A  | 1/2016 |
| CN | 106550465 A  | 3/2017 |
| WO | 2016163623 A1 | 10/2016 |

OTHER PUBLICATIONS

Orfanos, Georgios, et al., "A Centralized MAC Protocol with QoS Support for Wireless LANs", IEEE International Symposium on Personal, Indoor and Mobile Radio Communications, 2007, pp. 1-5.
(Continued)

*Primary Examiner* — Deepa Belur
(74) *Attorney, Agent, or Firm* — Murphy, Bilak & Homiller, PLLC (57) ABSTRACT

A method and device for transmitting downlink control information. The method includes: transmitting downlink control information comprising one or more fields indicating the number of scheduled time intervals to a terminal device. Therefore, the number of scheduled time intervals could be indicated for a terminal device in case that multiple time interval scheduling is adopted.

15 Claims, 4 Drawing Sheets

(52) U.S. Cl.
CPC ......... *H04L 5/0094* (2013.01); *H04W 72/042* (2013.01); *H04W 72/0446* (2013.01)

(56) References Cited

U.S. PATENT DOCUMENTS

| | | | |
|---|---|---|---|
| 2017/0311276 A1* | 10/2017 | Tsai | H04B 7/0617 |
| 2017/0366311 A1* | 12/2017 | Iyer | H04L 5/0007 |
| 2017/0367046 A1* | 12/2017 | Papasakellariou | H04L 5/0048 |
| 2017/0367110 A1* | 12/2017 | Li | H04W 74/0816 |
| 2018/0255550 A1* | 9/2018 | Takeda | H04L 5/0094 |
| 2019/0230696 A1* | 7/2019 | Kim | H04W 74/0833 |
| 2019/0320450 A1* | 10/2019 | Li | H04W 72/0446 |
| 2020/0100273 A1* | 3/2020 | Gao | H04W 72/1284 |
| 2020/0100275 A1* | 3/2020 | Tang | H04W 72/04 |
| 2020/0343995 A1* | 10/2020 | Shao | H04B 7/0626 |
| 2020/0389914 A1* | 12/2020 | Zhao | H04W 72/1273 |

OTHER PUBLICATIONS

Unknown, Author, "DCI for NB-IoT", 3GPP TSG RAN WG1 Meeting #84bis, R1-162626, Busan, Korea, Apr. 11-15, 2016, pp. 1-7.

* cited by examiner

METHOD AND DEVICE FOR TRANSMITTING DOWNLINK CONTROL INFORMATION

TECHNICAL FIELD

Embodiments of the present disclosure generally relate to the field of communications, and more particularly, to a method and device for transmitting downlink control information (DCI).

BACKGROUND

This section introduces aspects that may facilitate better understanding of the present disclosure. Accordingly, the statements of this section are to be read in this light and are not to be understood as admissions about what is in the prior art or what is not in the prior art.

New radio (NR) will support carrier frequencies from below 1 GHz to 100 GHz. Numerology associated for different carrier frequencies is $15*2^n$ kHz. For example, when subcarrier spacing (SCS) 15 kHz is applied, a length (or duration) of transmission time interval (TTI) is equal to a length of a subframe, i.e. 1 ms. This TTI may include 14 orthogonal frequency division multiplexing (OFDM) symbols. However, when SCS 240 kHz is applied, the length of the TTI is 0.0625 ms.

In some scenarios, a short-TTI operation may be considered due to large SCS for high frequency operation, and multiple slot scheduling may be of more interest in NR compared to long term evolution (LTE).

In NR, overhead of physical downlink control channel (PDCCH) may be saved or reduced when multiple slot scheduling is adopted since one PDCCH may be shared by multiple slots. Furthermore, the overhead of uplink-downlink switching may also be reduced for time division duplex (TDD) when multiple slot scheduling is adopted.

SUMMARY

The inventors found that for different numerologies (such as with different TTI duration), the number (or may be referred to as the amount) of TTIs within one subframe is different. It should be considered that how to indicate the number of scheduled time internals (such as slots) for a terminal device in case that multiple time interval scheduling is adopted.

In order to solve at least part of the above problems, methods, apparatus, devices and computer programs are provided in the present disclosure. It may be appreciated that embodiments of the present disclosure are not limited to a wireless system operating in NR network, but could be more widely applied to any application scenario where similar problems exist.

Various embodiments of the present disclosure mainly aim at providing methods, devices and computer programs for controlling a transmission between a transmitter and a receiver, for example, in a shared frequency band. Either of the transmitter and the receiver could be, for example, a terminal device or a network device. Other features and advantages of embodiments of the present disclosure will also be understood from the following description of specific embodiments when reading in conjunction with the accompanying drawings, which illustrate, by way of example, the principles of embodiments of the present disclosure.

In general, embodiments of the present disclosure provide a solution for transmitting/receiving downlink control information. Downlink control information including one or more fields indicating the number of scheduled time intervals may be received by a terminal device from a network device.

In a first aspect, there is provided a method of operating a terminal device, the method includes: receiving downlink control information including a field indicating the number of scheduled time intervals from a network device; and obtaining the number of scheduled time intervals from the field; a length of the field and/or a granularity of a value carried in the field are/is adaptive with the maximum number of the scheduled time intervals.

In an embodiment, the time interval includes one of the following: a frame, a subframe, a slot, a mini slot, and a symbol.

In an embodiment, the length of the field is different for serving carriers with different subcarrier spacings.

In an embodiment, the length of the field is determined based on a reference subcarrier spacing.

In an embodiment, the method further includes: determining the length of the field according to a numerology of a serving carrier when monitoring the downlink control information.

In an embodiment, the granularity of the value carried in the field is different for serving carriers with different subcarrier spacings.

In an embodiment, one or more granularity values are predefined or configured for indicating the granularity of the value carried in the field.

In an embodiment, the number of scheduled time intervals is determined by the following formula: $N=V*X0$; where, N denotes the number of scheduled time intervals, V denotes the value carried in the field and X0 denotes a granularity value.

In an embodiment, the number of scheduled time intervals is determined by the following formula: $N=(V+1)*X1$ when $V \leq M-1$; and $N=M*X1+(V-M+1)*X2$ when $V>M-1$; where, N denotes the number of scheduled time intervals, V denotes the value carried in the field, X1 and X2 denotes the granularity values and M denotes a threshold value.

In an embodiment, the method further includes: receiving a signaling for configuring one or more granularity values and/or a threshold value from the network device.

In a second aspect, there is provided a method of operating a terminal device, the method includes: receiving downlink control information including a first field and/or a second field indicating the number of scheduled time intervals from a network device; and obtaining the number of scheduled time intervals from the first field and/or the second field.

In an embodiment, the length of the first field is the same for serving carriers with different subcarrier spacings.

In an embodiment, the first field is configured to carry all information of the number of scheduled time intervals when the number of scheduled time intervals is less than or equal to a threshold value; and the first field is configured to carry a part of information of the number of scheduled time intervals and the second field is configured to carry another part of information of the number of scheduled time intervals when the number of scheduled time intervals is larger than the threshold value.

In an embodiment, the threshold value is $2^L-1$; where, L denotes the length of the first field.

In an embodiment, the second field is one or more of the following fields in the downlink control information: a hybrid automatic repeat request (HARQ) process field, a new data indicator (NDI) field, and a redundancy version indicator (RVI) field.

In a third aspect, there is provided a method of operating a network device, the method includes: transmitting downlink control information including a field indicating the number of scheduled time intervals to a terminal device; a length of the field and/or a granularity of a value carried in the field are/is adaptive with the maximum number of the scheduled time intervals.

In a fourth aspect, there is provided a method of operating a network device, the method includes: transmitting downlink control information including a first field and/or a second field indicating the number of scheduled time intervals to a terminal device.

In a fifth aspect, there is provided a terminal device, including a processor and a memory. The memory containing instructions executable by the processor whereby the terminal device is operative to perform a method according to the first and second aspects.

In a sixth aspect, there is provided a network device, including a processor and a memory. The memory containing instructions executable by the processor whereby the network device is operative to perform a method according to the third and fourth aspects.

According to various embodiments of the present disclosure, downlink control information including one or more fields indicating the number of scheduled time intervals may be received by a terminal device from a network device. Therefore, the number of scheduled time intervals could be indicated for a terminal device in case that multiple time interval scheduling is adopted.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable, and/or other suitable the first generation (1G), the second generation (2G), 2.5G, 2.75G, the third generation (3G), the fourth generation (4G), 4.5G, the future fifth generation (5G) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL transmission refers to a transmission from the network device to a terminal device, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Now some exemplary embodiments of the present disclosure will be described below with reference to the figures.

Figure 1:
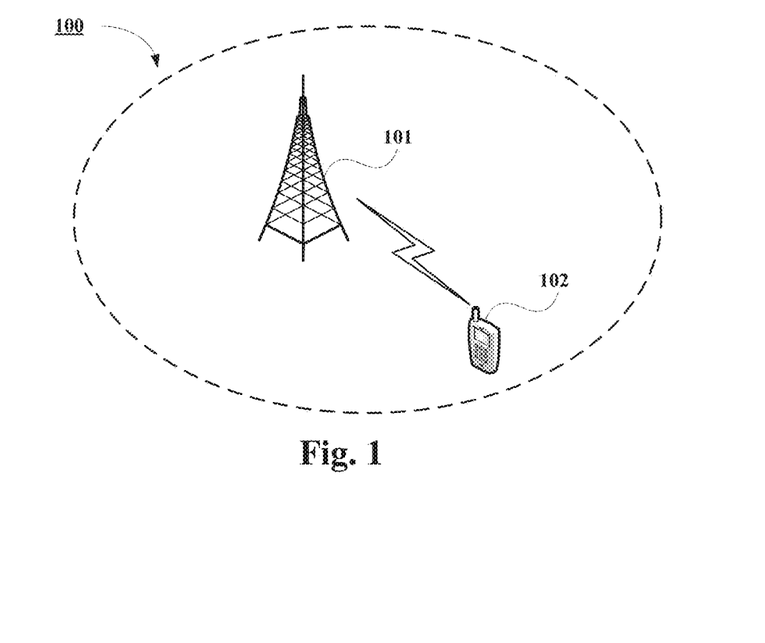
FIG. 1 is a schematic diagram which shows a wireless communication network.

FIG. 1 shows a schematic diagram of a wireless communication network 100 in which embodiments of the disclosure may be implemented. As shown in FIG. 1, the wireless communication network 100 may include one or more network devices, for example network devices 101.

It will be appreciated that the network device 101 could also be in a form of gNB, Node B, eNB, BTS (Base Transceiver Station), and/or BSS (Base Station Subsystem), access point (AP) and the like. The network device 101 may provide radio connectivity to a set of terminal devices or UEs 102-1, 102-2, . . . , 102-N (collectively referred to as "terminal device(s) 102) within its coverage, where N is a natural number.

The network device 101 includes processing circuitry, device readable medium, interface, user interface equipment, auxiliary equipment, power source, power delivery circuitry, and antenna. These components are depicted as single boxes located within a single larger box, and in some cases, contain additional boxes therein.

In practice, however, the network device 101 may include multiple different physical components that make up a single illustrated component (e.g., interface includes ports/terminals for coupling wires for a wired connection and radio front end circuitry for a wireless connection). As another example, network device 101 may be a virtual network node. Similarly, a network node may be composed of multiple physically separate components (e.g., a NodeB component and a RNC component, a BTS component and a BSC component, etc.), which may each have their own respective components.

In certain scenarios in which network device includes multiple separate components (e.g., BTS and BSC components), one or more of the separate components may be shared among several network nodes. For example, a single RNC may control multiple NodeBs. In such a scenario, each unique NodeB and RNC pair may in some instances be considered a single separate network node. In some embodiments, a network node may be configured to support multiple radio access technologies (RATs). In such embodiments, some components may be duplicated (e.g., separate device readable medium for the different RATs) and some components may be reused (e.g., the same antenna may be shared by the RATs).

Although the network device 101 illustrated in the example wireless communication network may represent a device that includes a particular combination of hardware components, other embodiments may include network nodes with different combinations of components. It is to be understood that a network device may include any suitable combination of hardware and/or software needed to perform the tasks, features, functions and methods disclosed herein.

It is to be understood that the configuration of FIG. 1 is described merely for the purpose of illustration, without suggesting any limitation as to the scope of the present disclosure. Those skilled in the art would appreciate that the wireless communication network 100 may include any suitable number of terminal devices and/or network devices and may have other suitable configurations.

Figure 2:
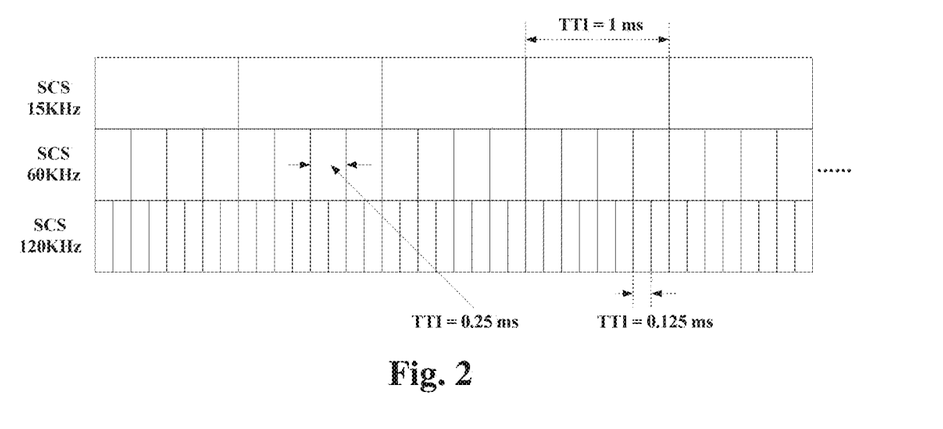
FIG. 2 is a schematic diagram which shows an example of the length of TTI with different numerologies.

FIG. 2 is a schematic diagram which shows an example of the length of TTI with different numerologies. As shown in FIG. 2, for different numerologies, such as the SCS 15 KHz and the SCS 120 KHz, the number of TTIs (or may be referred as the amount of the TTIs) within one subframe (e.g. 1 ms) is different. For instance, there are 8 TTIs within 1 ms for SCS 120 kHz while there is only 1 TTI within 1 ms for SCS 15 kHz.

For unlicensed operation, it requires a transmitter to occupy a channel for as long time as possible because a transmitter has to perform another listen before talk (LBT) once the transmitter stop transmission for a certain time. Due to the additional LBT, the transmitter may lose the channel since another transmitter may occupy the channel. Hence multiple slot scheduling is even more important for unlicensed operation than licensed operation from channel occupation perspective.

However, currently there isn't a scheme on how to indicate the number of scheduled slots for a terminal device in case that multiple slot scheduling is adopted considering different TTI duration. For multiple numerology operation, an indication scheme for indicating the number of scheduled slots shall be improved.

It should be appreciated that the slot is only used as an example; it is not limited in this disclosure. Next, time interval will be used for illustration and the time interval may include one of the following: a frame, a subframe, a slot, a mini slot, a symbol, a TTI, etc.

The time interval may be one transmission duration of 7 OFDM symbols, or one transmission duration of 2 OFDM symbols or other configured value of OFDM symbols. The shorter the time interval is, the larger the number of time intervals is in a given time duration.

First Aspect of Embodiments

A method for receiving downlink control information is provided in an embodiment. The method is implemented at a terminal device as an example.

Figure 3:
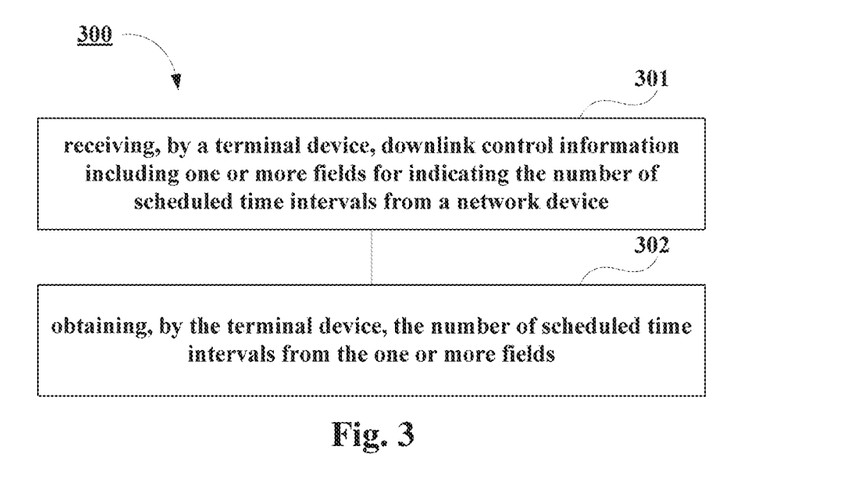
FIG. 3 is a flowchart which shows a method for receiving DCI in accordance with an embodiment of the present disclosure.

FIG. 3 is a flowchart which shows a method 300 for receiving DCI in accordance with an embodiment of the present disclosure, and illustrates the method for receiving DCI as an example.

As shown in FIG. 3, the method 300 includes receiving, by a terminal device, downlink control information including one or more fields indicating the number of scheduled time intervals from a network device, at block 301; and obtaining, by the terminal device, the number of scheduled time intervals from the one or more fields, at block 302.

In an embodiment, a field indicating the number of scheduled time intervals is included in the DCI, and a length of the field is adaptive with the maximum number of the scheduled time intervals.

That is to say, the length of the field may be variable. For example, when the maximum number of the scheduled time intervals is 8, the length of the field is 3, such that 3 bits may be carried in the field; when the maximum number of the scheduled time intervals is 32, the length of the field is 5, such that 5 bits may be carried in the field.

In this embodiment, the length of the field may be different for serving carriers with different subcarrier spacings. The length of the field may be determined based on a reference subcarrier spacing.

That is to say, the length of the field for a serving carrier with a first subcarrier spacing may be different from a length of a field for another serving carrier with a second subcarrier spacing which is different from the first subcarrier spacing.

For example, one field length may firstly be defined based on SCS 15 kHz (reference subcarrier spacing), and the field length of another numerology may be derived by referring to the field length of SCS 15 kHz considering the difference of TTI length between numerologies.

For instance, the maximum number of schedulable slots is 8 for SCS 15 kHz. i.e. 3 bits may be used to indicate the number of scheduled slots; For SCS 120 kHz, TTI length is ⅛ of the TTI length for SCS 15 kHz, such that the number of TTIs for SCS 120 kHz is 8 times as that for SCS 15 kHz in a given time duration. Hence, more bits are needed (i.e. 6 bits in total) to indicate the number of scheduled TTIs for SCS 120 kHz.

In this embodiment, the terminal device may determine the length of the field according to a numerology of a serving carrier when monitoring the downlink control information. For example, the terminal device may determine a size of an actual DCI format at DCI monitoring based on the numerology of the serving carrier.

In an embodiment, a field indicating the number of scheduled time intervals is included in the DCI, and a granularity of a value carried in the field is adaptive with the maximum number of the scheduled time intervals.

In this embodiment, the granularity of the value carried in the field may be different for serving carriers with different subcarrier spacings. That is to say, the granularity of the value carried in the field for a serving carrier with a first subcarrier spacing may be different from a granularity of a value carried in a field for another serving carrier with a second subcarrier spacing which is different from the first subcarrier spacing.

For example, the length of the field to indicate the number of scheduled slots in the DCI does not change as the numerology changes, while the granularity for shorter TTI may be larger. The granularity may be configurable via a signaling, such as radio resource control (RRC) signaling. Alternatively, the granularity may be predefined based on a reference numerology.

In this embodiment, the length of the field does not change at the cost of losing some flexibility since some values cannot be indicated due to restriction of granularity. However, it is not limited thereto, the length of the field may also be changed according to actual scenarios.

For example, the number of scheduled time intervals may be determined by the following formula: $N=V*X0$; wherein, N denotes the number of scheduled time intervals, V denotes the value carried in the field and X0 denotes a granularity value.

In this example, the maximum number of schedulable slots may be $2^L*X0$, wherein L is the length of the field and X0 is the granularity value, i.e., single granularity is applied in multiple slot scheduling.

As an example, there are 4 bits in total in the field to indicate the number of scheduled slots for a terminal device. For SCS 15 kHz, the value carried in the field may indicate up to 16 short slots while each short slot includes 7 OFDM symbols. Then the granularity of the value is 1 short slot, such that X0 may be 0.5. For SCS 30 kHz, the value carried in the field may indicate up to 16 slots while each slot includes 14 OFDM symbols. Then the granularity of the value is 1 slot, such that X0 may be 1. For SCS 60 kHz, the value carried in the field may indicate up to 32 slots while each slot includes 14 OFDM symbols. Then the granularity of the value is 2 slots, such that X0 may be 2.

It should be appreciated that an even granularity scheme with a granularity value is illustrated in above as an example, but it is mot limited thereto, an uneven granularity scheme with more than one granularity values also may be adopted.

For example, the number of scheduled time intervals may be determined by the following formula: $N=(V+1)*X1$ when $V \leq M-1$; and $N=M*X1+(V-M+1)*X2$ when $V>M-1$; wherein, N denotes the number of scheduled time intervals. V denotes the value carried in the field, X1 and X2 denotes the granularity values and M denotes a threshold value.

In this example, multiple granularities are defined to use the same field to indicate the scheduled slots for a terminal device. For example, the maximum number of schedulable slots may be $M*X1+(2^L-M)*X2$, wherein L is the length of the field, X1 and X2 are a first granularity value and a second granularity value respectively, M is a threshold value to determine whether the second granularity value is applied or not. X1 and/or X2 and/or M may be configurable via RRC signaling; or may be predefined.

As an example, X1 may be a smaller value than X2 and at least X1 slots should be scheduled for a terminal device if multiple slot scheduling is applied for the terminal device. However, it is not limited thereto.

For example, when 4 bits are used, there are in total 16 values. Taking SCS 120 kHz as an example, there are 64 TTIs within 8 ms. The granularity for the first 8 (i.e. M=8) values (i.e. 0~7) may be 2 (i.e. X1=2) and the granularity for the last 8 values (i.e. 8~15) may be 6 (i.e. X2=6), and the maximum number of schedulable slots may be $8*2+(2^4-8)*6=64$.

In this way, there is a benefit to have better granularity for data transmission which does not need so many slots. For the data transmission which needs large number of slots, the granularity is large.

In an embodiment, one or more granularity values may be predefined or configured for indicating the granularity of the value carried in the field.

Figure 4:
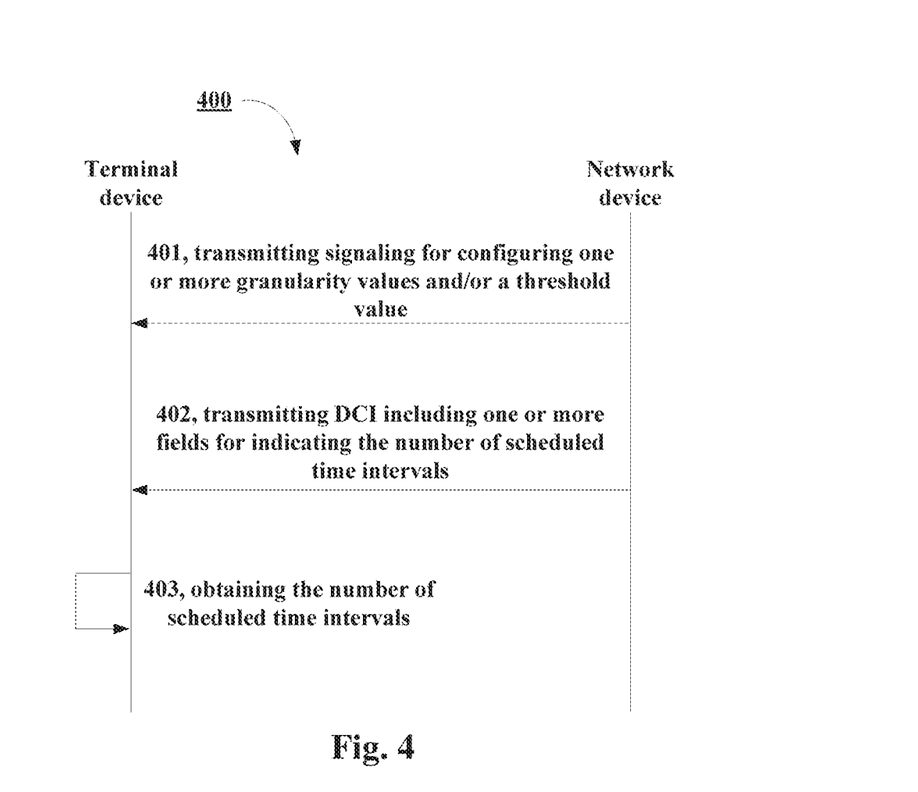
FIG. 4 is a flowchart which shows a method for transmitting/receiving DCI in accordance with an embodiment of the present disclosure.

FIG. 4 is a flowchart which shows a method 400 for transmitting/receiving DCI in accordance with an embodiment of the present disclosure, and illustrates the method for transmitting/receiving DCI as an example.

As shown in FIG. 4, the method 400 may include transmitting, by a network device, one or more signaling for configuring one or more granularity values and/or a threshold value to a terminal device, at 401. The information of the one or more signaling may be transmitted by using one or more messages, at the same time or successively.

As shown in FIG. 4, the method 400 may further include receiving, by the terminal device, downlink control information including one or more fields indicating the number of scheduled time intervals from a network device, at 402; and obtaining, by the terminal device, the number of scheduled time intervals from the one or more fields, at 403.

It should be appreciated that FIG. 4 is only an example of the disclosure, it is not limited thereto. For example, the order of operations at blocks (or steps) may be adjusted and/or some blocks (or steps) may be omitted. Moreover, some blocks (or steps) not shown in FIG. 4 may be added.

In an embodiment, two or more fields indicating the number of scheduled time intervals are included in the DCI. For example, a first field and/or a second field may be used to indicate the number of scheduled time intervals.

For example, the length of the first field may be the same for serving carriers with different subcarrier spacings. The second field may be one or more of the following fields in the downlink control information: a hybrid automatic repeat request (HARQ) process field, a new data indicator (NDI) field, and a redundancy version indicator (RVI) field. However, it is not limited thereto, other existing field or a new field may also be adopted according to actual scenarios.

In this embodiment, the first field may be configured to carry all information of the number of scheduled time intervals when the number of scheduled time intervals is less than or equal to a threshold value; or the first field may be configured to carry a part of information of the number of scheduled time intervals and the second field may be configured to carry another part of information of the number of scheduled time intervals when the number of scheduled time intervals is larger than the threshold value.

In this embodiment, the threshold value may be predefined, or may be configured by the network device and/or the terminal device. For example, the threshold value may be $2^L-1$; wherein, L denotes the length of the first field.

Next, the HARQ process field is used as an example. When the number of scheduled slots is huge for a terminal device in case that multiple slot scheduling is adopted, the terminal device may not have enough soft buffer to store soft information for data blocks with NACK, hence HARQ process ID is not useful since the information could not be fed back by using the HARQ process; while when the number of scheduled slots is small, there is still considerable probability that the terminal device still has enough soft buffer to store the soft information for data blocks with NACK, hence HARQ process ID is still useful. Based on this assumption, the field of HARQ process ID (i.e. the HARQ process field) may be used to indicate the number of scheduled slots when the number of scheduled slots is larger than a threshold value.

For instance, it may be predefined or configured that the HARQ process filed is used as an extended field to indicate the number of scheduled slots when the indicated value is larger than $2^L-1$.

For example, a sequence of bits in the first field dedicated for indicating the number of scheduled slots is $b_0, b_1, \ldots, b_{L-1}$. A sequence of bits in the second field (HARQ process field) for HARQ process ID indication is $a_0, a_1, \ldots, a_{z-1}$.

When $b_0b_1 \ldots b_{L-1}=11 \ldots 1$ (that is, binary number with L consecutive 1s), the HARQ process field is used to indicate the number of scheduled slots for the terminal device. The actual number of the scheduled slots for the terminal device may be binary number $a_0a_1 \ldots a_{z-1}b_0 b_1 \ldots b_{L-1}$. When $b_0b_1 \ldots b_{L-1}<11 \ldots 1$, the HARQ process field still indicates HARQ process ID, i.e, the actual number of the scheduled slots may be binary number $b_0b_1 \ldots b_{L-1}$.

It should be appreciated that this embodiment may ensure good granularity without increasing the size of DCI and with minor loss of some benefits of using HARQ.

As can be seen from the above embodiments, downlink control information including one or more fields indicating the number of scheduled time intervals may be received by a terminal device from a network device. Therefore, the number of scheduled time intervals could be indicated for a terminal device in case that multiple time interval scheduling is adopted.

Second Aspect of Embodiments

A method for transmitting DCI is provided in an embodiment. The method is implemented at a network device as an example, and the same contents as those in the first aspect of embodiments are omitted.

Figure 5:
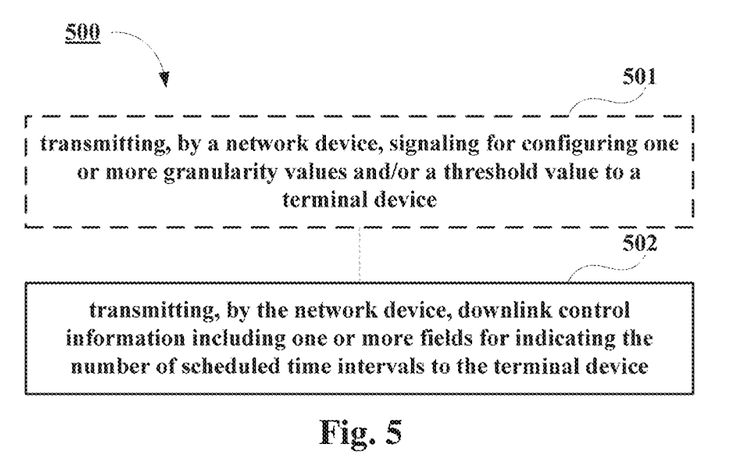
FIG. 5 is a flowchart which shows a method for transmitting DCI in accordance with an embodiment of the present disclosure.

FIG. 5 is a flowchart which shows a method 500 for transmitting DCI in accordance with an embodiment of the present disclosure, and illustrates the method for transmitting DCI as an example.

As shown in FIG. 5, the method 500 includes transmitting, by a network device, downlink control information including one or more fields indicating the number of scheduled time intervals to a terminal device, at block 502.

In an embodiment, a field indicating the number of scheduled time intervals is included in the DCI, and a length of the field is adaptive with the maximum number of the scheduled time intervals.

In an embodiment, a field indicating the number of scheduled time intervals is included in the DCI, and a granularity of a value carried in the field is adaptive with the maximum number of the scheduled time intervals.

As shown in FIG. 5, the method 500 may include transmitting, by the network device, one or more signaling for configuring one or more granularity values and/or a threshold value to the terminal device, at block 501.

In an embodiment, two or more fields indicating the number of scheduled time intervals are included in the DCI. For example, a first field and/or a second field may be used to indicate the number of scheduled time intervals. The second field may be one or more of the following fields in the downlink control information: a hybrid automatic repeat request (HARQ) process field, a new data indicator (NDI) field, and a redundancy version indicator (RVI) field.

As can be seen from the above embodiments, downlink control information including one or more fields indicating the number of scheduled time intervals may be received by a terminal device from a network device. Therefore, the number of scheduled time intervals could be indicated for a terminal device in case that multiple time interval scheduling is adopted.

Third Aspect of Embodiments

An apparatus for receiving DCI is provided in an embodiment. The apparatus may be the terminal device 102 or may be configured in the terminal device 102, and the same contents as those in the first aspect of embodiments are omitted.

Figure 6:
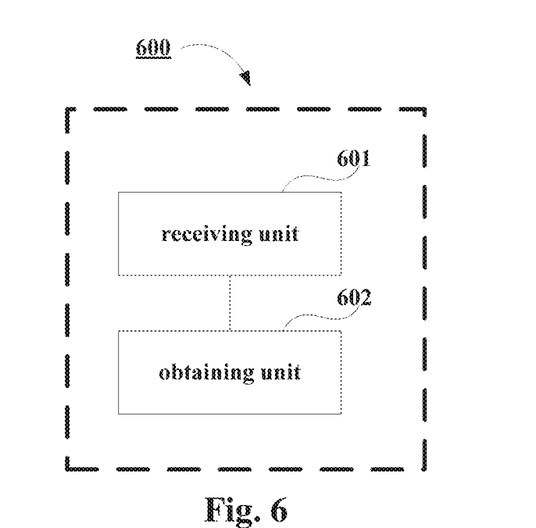
FIG. 6 is a block diagram which shows an apparatus for receiving DCI in accordance with an embodiment of the present disclosure.

FIG. 6 shows a block diagram of an apparatus 600 for receiving DCI in accordance with an embodiment of the present disclosure.

As shown in FIG. 6, the apparatus 600 includes: a receiving unit 601 configured to receive downlink control information including one or more fields indicating the number of scheduled time intervals from a network device; and an obtaining unit 602 configured to obtain the number of scheduled time intervals from the one or more fields.

In an embodiment, a field indicating the number of scheduled time intervals is included in the DCI, and a length of the field is adaptive with the maximum number of the scheduled time intervals.

In an embodiment, a field indicating the number of scheduled time intervals is included in the DCI, and a granularity of a value carried in the field is adaptive with the maximum number of the scheduled time intervals.

In an embodiment, two or more fields indicating the number of scheduled time intervals are included in the DCI. For example, a first field and/or a second field may be used to indicate the number of scheduled time intervals. The second field may be one or more of the following fields in the downlink control information: a hybrid automatic repeat request (HARQ) process field, a new data indicator (NDI) field, and a redundancy version indicator (RVI) field.

It should be appreciated that components included in the apparatus 600 correspond to the operations of the method 300. Therefore, all operations and features described above with reference to FIG. 3 are likewise applicable to the components included in the apparatus 600 and have similar effects. For the purpose of simplification, the details will be omitted.

It should be appreciated that the components included in the apparatus 600 may be implemented in various manners, including software, hardware, firmware, or any combination thereof.

In an embodiment, one or more units may be implemented using software and/or firmware, for example, machine-executable instructions stored on the storage medium. In addition to or instead of machine-executable instructions, parts or all of the components included in the apparatus 600 may be implemented, at least in part, by one or more hardware logic components.

For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The apparatus 600 may be a part of a device. But it is not limited thereto, for example, the apparatus 600 may be the terminal device 102, other parts of the terminal device 102, such as transmitter and receiver, are omitted in the FIG. 6.

As can be seen from the above embodiments, downlink control information including one or more fields indicating the number of scheduled time intervals may be received by a terminal device from a network device. Therefore, the number of scheduled time intervals could be indicated for a terminal device in case that multiple time interval scheduling is adopted.

Fourth Aspect of Embodiments

An apparatus for transmitting DCI is provided in an embodiment. The apparatus may be the network device 101 or may be configured in the network device 101, and the same contents as those in the second aspect of embodiments are omitted.

Figure 7:
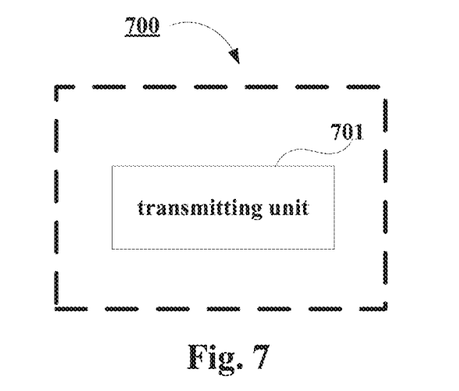
FIG. 7 is a block diagram which shows an apparatus for transmitting DCI in accordance with an embodiment of the present disclosure.

FIG. 7 shows a block diagram of an apparatus 700 for transmitting DCI in accordance with an embodiment of the present disclosure.

As shown in FIG. 7, the apparatus 700 includes: a transmitting unit 701 configured to transmit downlink control information including one or more fields indicating the number of scheduled time intervals to a terminal device.

In an embodiment, a field indicating the number of scheduled time intervals is included in the DCI, and a length of the field is adaptive with the maximum number of the scheduled time intervals.

In an embodiment, a field indicating the number of scheduled time intervals is included in the DCI, and a granularity of a value carried in the field is adaptive with the maximum number of the scheduled time intervals.

In an embodiment, two or more fields indicating the number of scheduled time intervals are included in the DCI. For example, a first field and/or a second field may be used to indicate the number of scheduled time intervals. The second field may be one or more of the following fields in the downlink control information: a hybrid automatic repeat request (HARQ) process field, a new data indicator (NDI) field, and a redundancy version indicator (RVI) field.

It should be appreciated that components included in the apparatus 700 correspond to the operations of the method 500. Therefore, all operations and features described above with reference to FIG. 5 are likewise applicable to the components included in the apparatus 700 and have similar effects. For the purpose of simplification, the details will be omitted.

It should be appreciated that the components included in the apparatus 700 may be implemented in various manners, including software, hardware, firmware, or any combination thereof.

In an embodiment, one or more units may be implemented using software and/or firmware, for example, machine-executable instructions stored on the storage medium. In addition to or instead of machine-executable instructions, parts or all of the components included in the apparatus 700 may be implemented, at least in part, by one or more hardware logic components.

For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The apparatus 700 may be a part of a device. But it is not limited thereto, for example, the apparatus 700 may be the network device 101, other parts of the network device 101, such as transmitter and receiver, are omitted in the FIG. 7.

As can be seen from the above embodiments, downlink control information including one or more fields indicating the number of scheduled time intervals may be received by a terminal device from a network device. Therefore, the number of scheduled time intervals could be indicated for a terminal device in case that multiple time interval scheduling is adopted.

Fifth Aspect of Embodiments

A communications system is provided, as shown in FIG. 1, the communication system 100 includes a network device 101 configured to perform a method for transmitting DCI according to the second aspect of embodiments and a terminal device 102 configured to perform a method for receiving DCI according to the first aspect of embodiments.

A device (such as a network device 101 or a terminal device 102) is provided in an embodiment, and the same contents as those in the first to fourth aspects of embodiments are omitted.

Figure 8:
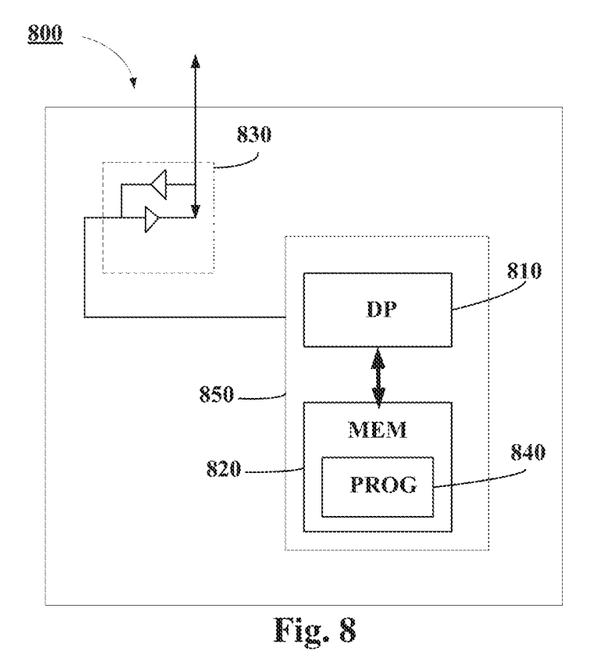
FIG. 8 is a simplified block diagram of a device that is suitable for implementing embodiments of the present disclosure.

FIG. 8 shows a simplified block diagram of a device 800 that is suitable for implementing embodiments of the present disclosure. It would be appreciated that the device 800 may be implemented as at least a part of, for example, the network device 101 or the terminal device 102.

As shown, the device 800 includes a communicating means 830 and a processing means 850. The processing means 850 includes a data processor (DP) 810, a memory (MEM) 820 coupled to the DP 810. The communicating means 830 is coupled to the DP 810 in the processing means 850. The MEM 820 stores a program (PROG) 840. The communicating means 830 is for communications with other devices, which may be implemented as a transceiver for transmitting/receiving signals.

In some embodiments, the device 800 acts as a terminal device. For example, the memory 820 stores a plurality of instructions; and the processor 810 is coupled to the memory 820 and configured to execute the instructions to: receive downlink control information including one or more fields indicating the number of scheduled time intervals from a network device; and obtain the number of scheduled time intervals from the one or more fields.

In some other embodiments, the device 800 acts as a network device. For example, the memory 820 stores a plurality of instructions; and the processor 810 is coupled to the memory 820 and configured to execute the instructions to: transmit downlink control information including one or more fields indicating the number of scheduled time intervals to a terminal device.

The PROG 840 is assumed to include program instructions that, when executed by the associated DP 810, enable the device 800 to operate in accordance with the embodiments of the present disclosure, as discussed herein with the methods 300-500. The embodiments herein may be implemented by computer software executable by the DP 810 of the device 800, or by hardware, or by a combination of software and hardware. A combination of the data processor 810 and MEM 820 may form processing means 850 adapted to implement various embodiments of the present disclosure.

The MEM 820 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the device 800, there may be several physically distinct memory modules in the device 800. The DP 810 may be of any type suitable to the local technical environment, and may include one or more of general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing devices. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general-purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine-readable medium, which may be any tangible medium that may contain, or store a program for use by or in connection with an instruction execution system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combination of the foregoing.

More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the device may be implemented in the general context of computer system-executable instructions, such as program modules, being executed by a computer system. Generally, program modules may include routines, programs, objects, components, logic, data structures, and so on that perform particular tasks or implement particular abstract data types. The device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method of operating a terminal device, comprising:
   receiving downlink control information comprising a field indicating the number of scheduled time intervals from a network device; and
   obtaining the number of scheduled time intervals from the field;
   wherein:
   a length of the field or a granularity of a value carried in the field, or both, are adaptive with the maximum number of the scheduled time intervals;
   the granularity of the value carried in the field for a serving carrier with a first subcarrier spacing is different from a granularity of a value carried in a field for another serving carrier with a second subcarrier spacing, which is different from the first subcarrier spacing; and
   the number of scheduled time intervals is determined by the formula $N=V*X0$, wherein N denotes the number of scheduled time intervals, V denotes the value carried in the field and X0 denotes a granularity value.

2. The method of claim 1, wherein the time interval comprises one of the following: a frame, a subframe, a slot, a mini slot, and a symbol.

3. The method of claim 1, wherein the length of the field for a serving carrier with a first subcarrier spacing is different from a length of a field for another serving carrier with a second subcarrier spacing which is different from the first subcarrier spacing.

4. The method of claim 3, wherein the length of the field is determined based on a reference subcarrier spacing.

5. The method of claim 3, wherein the method further comprises:
   determining the length of the field according to a numerology of a serving carrier when monitoring the downlink control information.

6. The method of claim 1, wherein one or more granularity values are predefined or configured for indicating the granularity of the value carried in the field.

7. The method of claim 1, wherein the method further comprises:
   receiving a signaling for configuring one or more granularity values or a threshold value or both from the network device.

8. A method of operating a terminal device, comprising:
   receiving downlink control information comprising a first field and/or a second field indicating a number of scheduled time intervals from a network device; and obtaining the number of scheduled time intervals from the first field and/or the second field;

wherein the first field is configured to carry all information of the number of scheduled time intervals when the number of scheduled time intervals is less than or equal to a threshold value, and wherein the first field is configured to carry a part of information of the number of scheduled time intervals and the second field is configured to carry another part of information of the number of scheduled time intervals when the number of scheduled time intervals is larger than the threshold value.

9. The method of claim 8, wherein the length of the first field is the same for serving carriers with different subcarrier spacings.

10. The method of claim 8, wherein the threshold value is $2^L-1$, where L denotes the length of the first field.

11. The method of claim 8, wherein the second field is one or more of the following fields in the downlink control information: a hybrid automatic repeat request (HARQ) process field, a new data indicator (NDI) field, and a redundancy version indicator (RVI) field.

12. A terminal device, comprising a processor and a memory, wherein the memory containing instructions executable by the processor whereby the terminal device is configured to:
receive downlink control information comprising a field indicating a number of scheduled time intervals from a network device; and
obtain the number of scheduled time intervals from the field;

wherein:
a length of the field or a granularity of a value carried in the field, or both, are adaptive with the maximum number of the scheduled time intervals;
the granularity of the value carried in the field for a serving carrier with a first subcarrier spacing is different from a granularity of a value carried in a field for another serving carrier with a second subcarrier spacing, which is different from the first subcarrier spacing; and
the number of scheduled time intervals is determined by the formula $N=V*X0$, wherein N denotes the number of scheduled time intervals, V denotes the value carried in the field and X0 denotes a granularity value.

13. The terminal device of claim 12, wherein the length of the field for a serving carrier with a first subcarrier spacing is different from a length of a field for another serving carrier with a second subcarrier spacing which is different from the first subcarrier spacing.

14. The terminal device of claim 13, wherein the terminal device is configured to determine the length of the field based on a reference subcarrier spacing.

15. The terminal device of claim 13, wherein the terminal device is configured to determine the length of the field according to a numerology of a serving carrier when monitoring the downlink control information.

* * * * *